Jan. 4, 1949. W. F. WRIGHT 2,458,459
TRANSMISSION MECHANISM
Filed Oct. 3, 1944
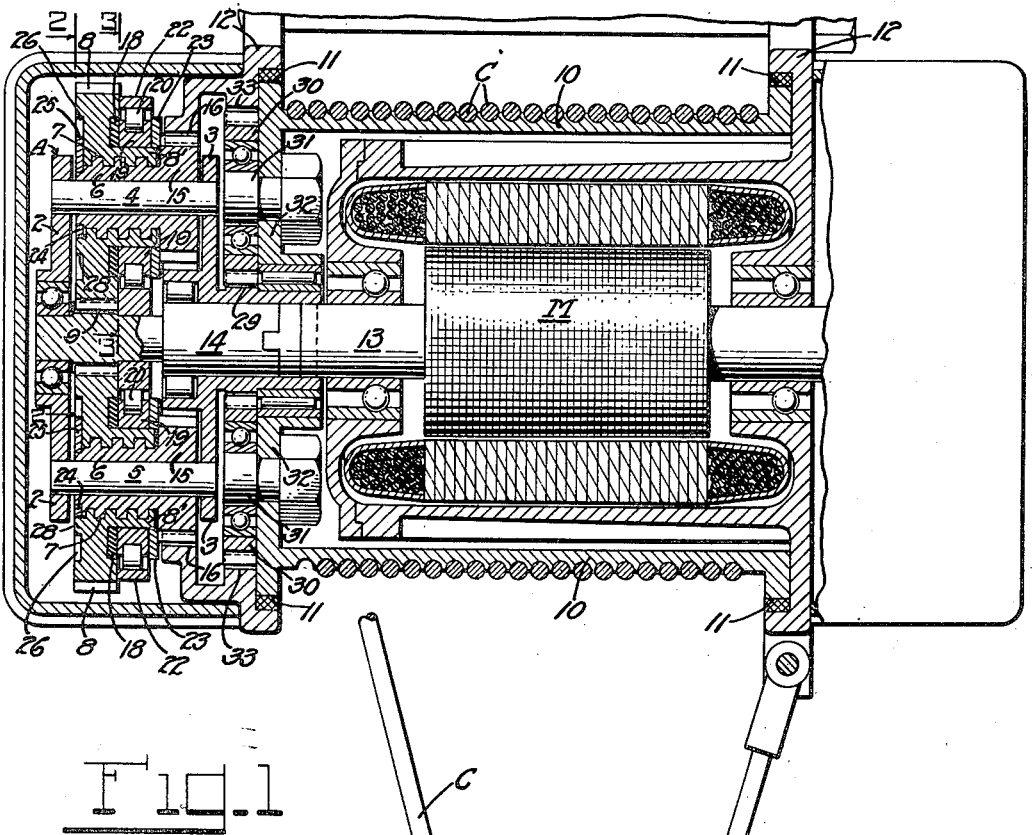
Fig. 1
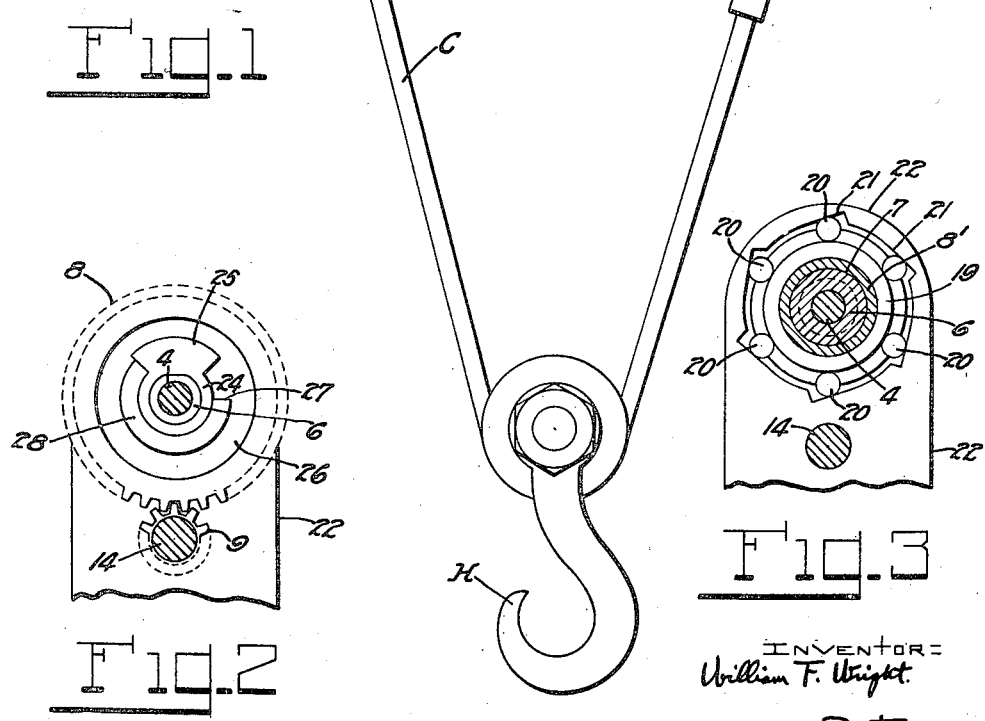
Fig. 2
Fig. 3
INVENTOR=
William F. Wright.
by Dike, Calvert & Porter
Attys.

Patented Jan. 4, 1949

2,458,459

UNITED STATES PATENT OFFICE 2,458,459

TRANSMISSION MECHANISM

William F. Wright, Lisbon, Ohio

Application October 3, 1944, Serial No. 557,031

18 Claims. (Cl. 74—280)

My invention relates to power transmission mechanism particularly, although not exclusively, for use in hoists, such as hand operated or electrically driven hoists. More particularly, the invention relates to a brake embodied in such mechanism for preventing the driven member acting as a driving member when the normal driving force is removed.

Hoists have been manufactured comprising a frame or stationary support in which a drum is rotatably mounted. A pulley carrying a hook for receiving the load is mounted upon a cable which is arranged to be wound upon the drum, one end of the cable being secured to the stationary support and its other end secured to the drum. The drum may be rotated by a motor through a power transmission or gear reduction, such as an epicyclic gear train. In an electric driven hoist it has been common to provide an electrically operated brake acting to prevent rotation of the drum in response to the load carried thereby when the motor is stopped. A mechanical brake of the type described in the United States Patent No. 1,387,850, dated August 16, 1921, also has been employed for this purpose. When a mechanical brake acts upon the high speed shaft of a gear train, the high speed causes excessive wear and when the brake acts upon the low speed member, the torque and pressure are excessive and cause excessive wear.

The present invention provides a mechanical brake acting upon a rotating member intermediate in the gear train of a power transmission or gear reduction mechanism and thus reduces wear on the brake. The invention makes possible, for example, the provision in an epicyclic gear assembly of a brake acting upon each of the gear trains, the load being sustained by a member rotating with the gear cage.

The invention will be more clearly understood from the following description in conjunction with the accompanying drawing in which, Fig. 1 is an elevational view, partly in section, of an electric hoist embodying the invention; and Figs. 2 and 3 are sectional views taken upon the lines 2—2 and 3—3 of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is illustrated in the accompanying drawing as embodied in an electric hoist comprising a drum 10 rotatably mounted in bearings 11 in a support 12. The drum 10 is provided with a spiral groove adapted to receive windings of a cable C which carries a pulley to which a hook H is secured. A motor M is positioned within the drum 10 with its field fixed to a portion of the support 12. The armature shaft 13 of the motor is rotatably mounted in the support and is aligned with and operatively connected with the drive shaft 14 of an epicyclic gear assembly. The gear assembly is carried by a cage, generally indicated by A, which is mounted for free rotation upon the drive shaft 14. The cage A comprises spaced plates 2 and 3 which are connected by rods 4 and 5. Separate identically constructed intermediate gear units are freely rotatable upon the rods 4 and 5. Each of these gear units comprises a sleeve 6, the outer surface of which is provided with a square screw thread 7. The thread 7 engages a threaded hole in a sleeve 8' integral with a gear 8 which meshes with a pinion 9 formed integral with the main drive shaft 14 thus permitting the gear 8 to be moved axially in either direction. A pinion 15 is formed integral with the sleeve 6 and meshes with an internal gear 16 formed upon the stationary support 12. One face of the gear 8 is provided with a concentric recess to receive a washer 18, such as leather or other friction material, which is adapted to be brought into engagement with a collar 19 rotatable and axially movable upon the sleeve 8'. The outer surface of the collar 19 is provided with an annular groove in which a plurality of rollers 20 are positioned. These rollers are adapted to engage inclined surfaces 21 (Fig. 3) formed in an opening in a plate 22 which is adapted to rotate about the axis of the shaft 14 and is common to both intermediate gear units. The plate 22 and collar 19 form the outer and inner members respectively of an overrunning clutch and may be locked together by any suitable means, such as the rollers 20. An annular bronze washer 23 surrounds the sleeve 8' and is positioned between the gear 15 thereon and the collar 19.

A ring 24 (Figs. 1 and 2) having an integral radially outwardly projecting sector-shaped lug 25 is fixed upon the tubular end of the sleeve 6 and is movable in a recess 26 in the surface of the gear 8. The lug 25 is adapted to engage the end 27 of a partial circular rib 28 formed on the gear 8. A gear 29 is formed integral with the plate 3 of the cage A and meshes with a gear 30 freely rotatable upon a stud shaft 31 fixed to a radially extending flange 32 on the drum 10. The gear 30 meshes with an internal gear 33 formed on the support 12.

If we assume when raising the hook carrying a load, the main drive shaft 14 and pinion 9 are rotating in a counter-clockwise direction, as viewed from the left in Fig. 1, the gear 8 rotates clockwise and will be moved to the right as viewed in Fig. 1 due to the action of the screw threads 7 and thereby frictionally clamp the leather washer 18, collar 19, and bronze washer 23 together and against the face of the gear 15 so that the gears 8 and 15 will rotate together as a temporary integral unit. Since the gears 8 and 15 are rotating as an integral unit the gear 15 is rotating in a clockwise direction as viewed from the left of Fig. 1, and since the gear 15 meshes with the stationary internal gear 16, the cage A will rotate about the main drive shaft 14 in a counter-clockwise direction. Since the gear 29 is integral with the cage A it also will rotate in a counter-clockwise direction and thus cause the gear 30 to rotate in a clockwise direction. Since the gear 30 meshes with the stationary internal gear 33, the drum will rotate in a counter-clockwise direction as viewed from the left of Fig. 1. Thus, in lifting a load the collar 19, plate 22 and rollers 20 now act as an overrunning clutch, that is, the collar 19 and plate 22 are not locked together.

If the power is shut off from the drive motor when a load is on the hook, the drum 10 will tend to rotate in a clockwise direction as viewed from the left of Fig. 1. This will cause the gear 30 to rotate in a counter-clockwise direction and cause the gear 29, together with the cage A, to rotate in a clockwise direction. The gear 15 and integral sleeve 6 will tend to rotate in a counter-clockwise direction and the screw threads 7 will tend to move the gear 8 toward the right as viewed in Fig. 1 so that the gear 8, collar 19, and gear 15 will be locked frictionally together and be rotating in a counter-clockwise direction. Since the plate 22 rotates with the cage A, it also will tend to rotate in a clockwise direction thereby causing the rollers 20 to lock the collar 19 to the plate 22. The overrunning clutch, formed by the collar 19, rollers 20 and plate 22, now is acting as a mechanical brake.

To lower the hook with no load, the pinion 9 is rotated clockwise as viewed from the left of Fig. 1 to rotate gear 8 counter-clockwise and cause the end 27 of rib 28 to engage lug 25 to rotate sleeve 6 and gear 15 counter-clockwise, thus causing cage A to rotate clockwise. This causes gear 30 to rotate counter-clockwise and the drum to rotate clockwise to lower the hook.

When lowering the hook carrying a load, the load acts to rotate the drum 10 in a clockwise direction as viewed from the left of Fig. 1 and this, as previously described, causes the gear 8 to move axially to the right to lock the gear 8, collar 19 and gear 15 frictionally together and cause the overrunning clutch to act as a mechanical brake and prevent rotation of the drum in a clockwise direction. However, the pinion 9 now is rotated clockwise as viewed from the left of Fig. 1 to rotate the gear 8 counter-clockwise and this causes the gear 8 to move axially to the left and thus release the frictional driving connection between the gear 8, the collar 19 and the gear 15 so that the drum 10 again is free to be rotated in response to the action of the load. Thus, in lowering the hook carrying a load, the load acts repeatedly to move the gear 8 axially toward the right and cause the overrunning clutch to act as a mechanical brake while the pinion 9 acts repeatedly to move the gear 8 axially toward the left to release the driving connection between the collar 19 and gear 15 and prevent the overrunning clutch acting as a brake. Consequently, the hook is lowered when carrying a load at substantially the same rate as when lowered without a load in response to the driving action of the pinion 9.

I claim:

1. In combination, a support mounted for rotation about a given axis, interlocking coaxial gears rotatably carried by said support for rotation about an axis parallel to and spaced from said given axis, a stationary gear operatively connected to one of said rotatable gears to cause the latter and said support to rotate in opposite directions, an overrunning clutch having an inner member rotatable about the axis of said rotatable gear and an outer member rotatable only with said support about said given axis, a driving member, means providing a driving connection between said driving member and said gear, a driven member, and means providing a driving connection between said support and driven member.

2. In combination, a support mounted for rotation about a given axis, interlocking coaxial gears rotatably carried by said support for rotation about an axis parallel to and spaced from said given axis, a stationary internal gear operatively connected to one of said rotatable gears to cause the latter and said support to rotate in opposite directions, an overrunning clutch having an inner member rotatable about an axis of said rotatable gear and the outer member rotatable only with said support about said given axis, a driving member, means providing a driving connection between said driving member and said gear, a driven member, and means providing a driving connection between said support and driven member.

3. In combination, a support mounted for rotation about a given axis, a gear and pinion rotatably carried by said support for rotation about an axis parallel to and spaced from said given axis, said gear and pinion having interlocking means operative on axial movement of one of them, a stationary gear operatively connected to said pinion to cause the latter and said support to rotate in opposite directions, an overrunning clutch having an inner member freely rotatable about said spaced axis and an outer member rotatable only with said support about said given axis, a driven member, means providing a driving connection between said support and driven member, and means providing a driving connection between said pinion and inner clutch member when said driven member tends to act as a driving member.

4. In combination, a support mounted for rotation about a given axis, a gear and pinion rotatably carried by said support for rotation about a common axis parallel to and spaced from said given axis, a stationary gear operatively connected to said pinion to cause the latter and said support to rotate in opposite directions, an overrunning clutch having an inner member freely rotatable about said common axis and an outer member rotatable only with said support about said given axis, a driven member, means providing a driving connection between said support and driven member, means providing a driving connection between said pinion and inner clutch member when said driven member tends to act as a driving member, a driving member operatively connected to said gear, means providing a driving connection between said gear and pinion when said gear is rotated in one direction, and means adapted to provide a driving connection between said gear and pinion when said gear is rotated in the opposite direction by said driving member.

5. In combination, a support mounted for rotation about a given axis, a gear and pinion rotatably carried by said support for rotation about a common axis parallel to and spaced from said given axis, means operatively connecting said gear and pinion to cause said gear to move axially relative to the pinion when one is rotated relative to the other, a stationary internal gear operatively connected to said pinion to cause the latter and said support to rotate in opposite directions, an overrunning clutch having an inner member positioned between and adjacent said gear and pinion for rotation freely about their common axis and for movement axially and an outer member rotatable only with said support about said given axis, a driving member operatively connected to said gear, a driven member, and means providing a driving connection between said support and driven member whereby when said driven member tends to act as a driving member said gear is moved axially to lock said inner clutch member frictionally with said pinion and gear and said clutch acts as a brake preventing rotation of said support, gear and pinion.

6. In combination, a support mounted for rotation about a given axis, a gear and pinion rotatably carried by said support for rotation about a common axis parallel to and spaced from said given axis, means operatively connecting said gear and pinion to cause said gear to move axially relative to the pinion when one is rotated relative to the other, a stationary internal gear operatively connected to said pinion to cause the latter and said support to rotate in opposite directions, an overrunning clutch having an inner member positioned between and adjacent said gear and pinion for rotation about their common axis and for movement axially and an outer member rotatable only with said support about said given axis, a driven member, means providing a driving connection between said support and driven member whereby when said driven member tends to act as a driving member said gear is moved axially to lock said inner clutch member frictionally with said pinion and gear and said clutch acts as a brake preventing rotation of said support, gear and pinion, a driving member operatively connected to said gear whereby when said gear is rotated in one direction it is caused to move axially to lock said inner clutch member, gear and pinion frictionally to rotate together, and means adapted to provide a driving connection between said gear and pinion when said gear is rotated in the opposite direction by said driving member.

7. In combination, a support mounted for rotation about a given axis, a gear and pinion rotatably carried by said support for rotation about a common axis parallel to and spaced from said given axis, a threaded connection between said gear and pinion to cause said gear to move axially relative to the pinion when one is rotated relative to the other, a stationary gear operatively connected to said pinion to cause the latter and said support to rotate in opposite directions, an overrunning clutch having an inner member positioned between and adjacent said gear and pinion for rotation about their common axis and for movement axially and an outer member rotatable only with said support about said given axis, a driving member operatively connected to said gear, a driven member and means providing a driving connection between said support and driven member whereby when said driven member tends to act as a driving member said gear is moved axially to lock said inner clutch member frictionally with said pinion and gear and said clutch acts as a brake preventing rotation of said support, gear and pinion.

8. In a power transmission, the combination of a support mounted for rotation about a given axis, a pair of gears adapted for relative axial movement rotatably carried by said support for rotation about an axis parallel to and spaced from said given axis, and an overrunning clutch having an inner member rotatable about the axis of said rotatable gears and an outer member rotatable only with said support about said given axis, said overrunning clutch including means adapted to provide a driving connection between said inner and outer clutch members and for disconnecting such driving connection.

9. In a power transmission, the combination of a support mounted for rotation about a given axis, a gear and pinion rotatably carried by said support for rotation about a common axis parallel to and spaced from said given axis, means operatively connecting said gear and pinion to cause said gear to move axially relative to the pinion when one is rotated relative to the other, and an overrunning clutch having an inner member positioned between and adjacent said gear and pinion for rotation about their common axis and for movement axially and an outer member rotatable only with said support about said given axis, said overrunning clutch including means adapted to provide a driving connection between said inner and outer clutch members and for disconnecting such driving connection.

10. In a power transmission, the combination of a support mounted for rotation about a given axis, a gear and pinion rotatably carried by said support for rotation about a common axis parallel to and spaced from said given axis, a threaded connection between said gear and pinion to cause said gear to move axially relative to the pinion when one is rotated relative to the other, and an overrunning clutch having an inner member positioned between and adjacent said gear and pinion for rotation about their common axis and for movement axially and an outer member rotatable only with said support about said given axis.

11. In a power transmission, the combination of a support mounted for rotation about a given axis, a gear and pinion rotatably carried by said support for rotation about a common axis parallel to and spaced from said given axis, means operatively connecting said gear and pinion to cause said gear to move axially relative to the pinion when one is rotated relative to the other, an overrunning clutch having an inner member positioned between and adjacent said gear and pinion for rotation about their common axis and for movement axially and an outer member rotatable only with said support about said given axis, a driving connection being effected between said gear and pinion when said gear is rotated in one direction, and means adapted to provide a driving connection between said gear and pinion when said gear is rotated in the opposite direction.

12. In combination, an overrunning clutch having an inner member freely rotatable about a given axis and an outer member rotatable only about an axis spaced from said given axis, a gear and pinion mounted for rotation about said given axis, means providing a driving connection between said gear and pinion when said gear is rotated in one direction, and means for providing a driving connection between said inner clutch member and said pinion when the latter tends to rotate in said one direction faster than said gear, said overrunning clutch including means adapted to provide a driving connection between said inner and outer clutch members and for disconnecting such driving connection.

13. In combination, an overrunning clutch having an inner member freely rotatable about a given axis and an outer member rotatable only about an axis spaced from said given axis, a gear and pinion mounted for rotation about said given axis, means providing a driving connection between said gear and pinion when said gear is rotated in one direction, and means for disconnecting said driving connection and for providing a driving connection between said inner clutch member and said pinion when the latter tends to rotate in said one direction faster than said gear, said overrunning clutch including means adapted to provide a driving connection between said inner and outer clutch members and for disconnecting such driving connection.

14. In combination, a support mounted for rotation about a given axis, a gear and pinion rotatably carried by said support for rotation about a common axis spaced from said given axis, an overrunning clutch having an inner member freely rotatable about said spaced axis and an outer member rotatable only about said given axis with said support, means providing a driving connection between said gear and pinion when said gear is rotated in one direction, and means for providing a driving connection between said inner clutch member and said pinion when the latter tends to rotate in said one direction faster than said gear.

15. In combination, a support mounted for rotation about a given axis, a gear and pinion rotatably carried by said support for rotation about a common axis spaced from said given axis, an overrunning clutch having an inner member freely rotatable about said spaced axis and an outer member rotatable only about said given axis with said support, means providing a driving connection between said gear and pinion when said gear is rotated in one direction, and means for disconnecting said driving connection and for providing a driving connection between said inner clutch member and said pinion when the latter tends to rotate in said one direction faster than said gear.

16. In a power transmission, the combination of a support mounted for rotation about a given axis, a gear and pinion rotatably carried by said support for rotation about a common axis parallel to and spaced from said given axis, an overrunning clutch having an inner member positioned between said gear and pinion and axially movable along and rotatable about said common axis, said overrunning clutch having an outer member rotatable only with said support about said given axis and having means adapted to provide a driving connection between said inner and outer members and for disconnecting such driving connection, a driving member operatively engaging said gear, means for causing said gear to move axially in either direction depending upon the direction of rotation of said driving member, a driven member, means providing a driving connection between said pinion and driven member, and means providing a driving connection between said gear and pinion when said gear is rotated in one direction by said driving member, said gear and inner clutch member being forced toward said pinion to provide a driving connection between the gear and pinion when the gear is rotated in the opposite direction by said driving member.

17. In a power transmission, the combination of an overrunning clutch having inner and outer members and means adapted to provide a driving connection between said inner and outer members and for disconnecting such driving connection, driving and driven members, means providing two driving connections between said driving and driven members one for driving the driven member in one direction and the other for driving the driven member in the opposite direction, each of said driving connections including a support mounted for rotation about a given axis, a gear and pinion spaced apart and carried by said support for rotation about a common axis parallel to and spaced from said given axis, said gear operatively engaging said driving member, a stationary internal gear engaging said pinion, and means for causing said rotatable gear to move axially when rotated by said driving member and when said pinion is rotated in response to rotation of said driven member acting as a driving member, said inner clutch member being axially movable along and rotatable about said common axis and positioned between said pinion and rotatable gear, said outer clutch member being rotatable only with said support about said given axis.

18. In a power transmission, the combination of an overrunning clutch having inner and outer members and means adapted to provide a driving connection between said inner and outer members and for disconnecting such driving connection, driving and driven members, means providing two driving connections between said driving and driven members one for driving the driven member in one direction and the other for driving the driven member in the opposite direction, each of said driving connections including a support mounted for rotation about a given axis, a gear and pinion spaced apart and carried by said support for rotation about a common axis parallel to and spaced from said given axis, said gear operatively engaging said driving member, a stationary internal gear engaging said pinion, and a threaded connection between said rotatable gear and pinion to move said rotatable gear axially when rotated by said driving member and when said pinion is rotated in response to rotation of said driven member acting as a driving member, said inner clutch member being axially movable along and rotatable about said common axis and positioned between said pinion and rotatable gear, said outer clutch member being rotatable only with said support about said given axis.

WILLIAM F. WRIGHT.

(References on following page)

REFERENCES CITED

The following references are of record in the file of this patent:

UNITED STATES PATENTS

| Number | Name | Date |
|---|---|---|
| 1,410,445 | Bailly | Mar. 21, 1922 |
| 1,728,325 | Blackstock | Sept. 17, 1929 |
| 2,014,316 | Farrell | Sept. 10, 1935 |
| 2,053,055 | Wadd | Sept. 1, 1936 |

FOREIGN PATENTS

| Number | Country | Date |
|---|---|---|
| 4,294 | Great Britain | Feb. 19, 1914 |